(12) United States Patent
Keener

(10) Patent No.: US 8,393,068 B2
(45) Date of Patent: Mar. 12, 2013

(54) METHOD AND APPARATUS FOR ASSEMBLING COMPOSITE STRUCTURES

(75) Inventor: Steven G. Keener, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 1010 days.

(21) Appl. No.: 11/935,949

(22) Filed: Nov. 6, 2007

(65) Prior Publication Data

US 2009/0126180 A1    May 21, 2009

(51) Int. Cl.
   *B21J 15/02* (2006.01)
(52) U.S. Cl. ............... 29/525.06; 29/525.07; 29/525.01; 29/525.04; 29/525.05; 411/908; 411/904
(58) Field of Classification Search ............... 29/525.01, 29/525.02, 525.03, 525.04, 525.06, 525.07, 29/525.08, 525.09, 525.05; 411/900, 901, 411/904, 908
   See application file for complete search history.

(56) References Cited

U.S. PATENT DOCUMENTS

| | | | |
|---|---|---|---|
| 2,099,678 A | 11/1937 | Curtis | |
| 2,365,372 A | 12/1944 | Allen | |
| 2,432,986 A | 12/1947 | Forman | |
| 2,493,452 A | 1/1950 | Grigg | |
| 2,510,693 A * | 6/1950 | Green | 411/501 |
| 2,525,736 A | 10/1950 | Taylor | |
| 2,887,003 A | 5/1959 | Brilmyer | |
| 3,013,643 A | 12/1961 | Perry | |
| 3,014,563 A | 12/1961 | Bratton | |
| 3,085,461 A | 4/1963 | Forman | |
| 3,107,572 A | 10/1963 | Orloff | |
| 3,128,999 A | 4/1964 | Schmitt | |
| 3,193,237 A | 7/1965 | Adams | |
| 3,262,353 A | 7/1966 | Waeltz et al. | |
| 3,302,510 A | 2/1967 | Gapp | |
| 3,307,731 A | 3/1967 | Seltzer | |
| 3,343,581 A | 9/1967 | Martin et al. | |
| 3,345,901 A | 10/1967 | Brosseit | |
| 3,348,444 A | 10/1967 | Brignola | |

(Continued)

FOREIGN PATENT DOCUMENTS

| | | |
|---|---|---|
| EP | 0203748 | 12/1986 |
| EP | 0258477 | 3/1988 |

(Continued)

OTHER PUBLICATIONS

Debski et al., "Composite Joints of Aerostructures", Transactions of the Institute of Aviation, No. 170-171, 1999, pp. 3-27.

(Continued)

*Primary Examiner* — Essama Omgba
(74) *Attorney, Agent, or Firm* — Yee & Associates, P.C.

(57) ABSTRACT

Method and apparatus for mechanically-joining components to assemble a composite structure. A first component and a second component may be provided. At least one of the first and second components may comprise a composite component. A hole may be formed in each of the first and second components. A metallic sleeve may be placed in the holes in the first and second components such that the metallic sleeve is in contact with the first and second components, and a composite rivet may be placed in the metallic sleeve. Heat and a deforming force may be applied to the composite rivet to join the first and second components to form an assembled composite structure.

22 Claims, 5 Drawing Sheets

U.S. PATENT DOCUMENTS

| | | | |
|---|---|---|---|
| 3,390,601 A | 7/1968 | Summerlin | |
| 3,411,957 A * | 11/1968 | Kiyoshi et al. | 148/544 |
| 3,489,312 A | 1/1970 | Hunckler et al. | |
| 3,535,136 A | 10/1970 | Beene | |
| 4,117,261 A | 9/1978 | Blevins et al. | |
| 4,127,345 A | 11/1978 | Angelosanto et al. | |
| 4,211,145 A | 7/1980 | Dolch | |
| 4,237,768 A | 12/1980 | Volkmann | |
| 4,312,613 A | 1/1982 | Binns | |
| 4,348,140 A | 9/1982 | Bergholz et al. | |
| 4,364,697 A | 12/1982 | Binns | |
| 4,405,256 A | 9/1983 | King, Jr. | |
| 4,414,011 A * | 11/1983 | Layden et al. | 65/442 |
| 4,451,189 A | 5/1984 | Pratt | |
| 4,457,652 A | 7/1984 | Pratt | |
| 4,478,543 A * | 10/1984 | Lyon | 411/34 |
| 4,478,544 A * | 10/1984 | Strand | 411/34 |
| 4,490,083 A | 12/1984 | Rebish | |
| 4,521,147 A | 6/1985 | King, Jr. et al. | |
| 4,542,056 A * | 9/1985 | Anglin et al. | 428/116 |
| 4,544,312 A | 10/1985 | Stencel | |
| 4,595,324 A | 6/1986 | Sadri | |
| 4,623,290 A | 11/1986 | Kikuzawa et al. | |
| 4,659,268 A | 4/1987 | Del Mundo et al. | |
| 4,681,497 A | 7/1987 | Berecz | |
| 4,687,394 A * | 8/1987 | Berecz | 411/361 |
| 4,687,395 A | 8/1987 | Berecz et al. | |
| 4,687,396 A * | 8/1987 | Berecz | 411/503 |
| 4,687,397 A * | 8/1987 | Berecz | 411/503 |
| 4,717,302 A | 1/1988 | Adams et al. | |
| 4,718,801 A * | 1/1988 | Berecz | 411/378 |
| 4,755,904 A * | 7/1988 | Brick | 361/117 |
| 4,761,871 A * | 8/1988 | O'Connor et al. | 29/432.1 |
| 4,767,248 A * | 8/1988 | Pratt | 411/45 |
| 4,778,637 A | 10/1988 | Adams et al. | |
| 4,815,906 A | 3/1989 | Binns | |
| 4,824,314 A * | 4/1989 | Stencel | 411/378 |
| 4,850,771 A * | 7/1989 | Hurd | 411/43 |
| 4,859,128 A * | 8/1989 | Brecz et al. | 411/43 |
| 4,861,211 A * | 8/1989 | Dunsmore | 411/501 |
| 4,863,330 A | 9/1989 | Olez et al. | 411/424 |
| 4,865,792 A * | 9/1989 | Moyer | 264/249 |
| 4,877,362 A | 10/1989 | Berecz et al. | |
| 4,949,450 A | 8/1990 | Scharres | |
| 4,967,463 A | 11/1990 | Pratt | |
| 4,985,979 A * | 1/1991 | Speakman | 29/512 |
| 5,033,925 A | 7/1991 | Moghe | |
| 5,051,636 A | 9/1991 | Ishimoto et al. | |
| 5,066,179 A | 11/1991 | Pratt | |
| 5,080,547 A | 1/1992 | Moghe | |
| 5,090,857 A * | 2/1992 | Dunn | 411/385 |
| 5,092,727 A | 3/1992 | Moghe | |
| 5,098,240 A | 3/1992 | Gapp et al. | |
| 5,114,290 A | 5/1992 | Moghe | |
| 5,127,783 A | 7/1992 | Moghe et al. | |
| 5,152,650 A * | 10/1992 | Kitagawa | 411/82.5 |
| 5,153,978 A | 10/1992 | Simmons | |
| 5,195,855 A | 3/1993 | Atkinson et al. | |
| 5,238,342 A | 8/1993 | Stencel | |
| 5,253,962 A | 10/1993 | Close, Jr. | |
| 5,256,017 A | 10/1993 | Smirnov et al. | |
| 5,314,282 A | 5/1994 | Murphy et al. | |
| 5,350,264 A | 9/1994 | Stencel | |
| 5,354,160 A * | 10/1994 | Pratt et al. | 411/501 |
| 5,361,483 A | 11/1994 | Rainville et al. | |
| 5,498,110 A | 3/1996 | Stencel et al. | |
| 5,569,008 A * | 10/1996 | Chapkovich | 411/383 |
| 5,582,494 A | 12/1996 | Cook | |
| 5,614,037 A | 3/1997 | Keener | |
| 5,620,287 A | 4/1997 | Pratt | |
| 5,634,751 A | 6/1997 | Stencel et al. | |
| 5,680,690 A | 10/1997 | Briles et al. | |
| 5,810,530 A | 9/1998 | Travis | |
| 5,858,133 A | 1/1999 | Keener | |
| 5,860,780 A | 1/1999 | Lenac et al. | |
| 5,902,535 A | 5/1999 | Burgess et al. | |
| 5,922,472 A | 7/1999 | Keener | |
| 5,944,918 A | 8/1999 | Keener | |
| 5,947,667 A | 9/1999 | Cassatt et al. | |
| 6,023,891 A | 2/2000 | Robertson et al. | |
| 6,036,418 A | 3/2000 | Stencel et al. | |
| 6,042,315 A * | 3/2000 | Miller et al. | 411/411 |
| 6,171,649 B1 | 1/2001 | Keener et al. | |
| 6,221,177 B1 | 4/2001 | Keener | |
| 6,274,200 B1 | 8/2001 | Keener et al. | |
| 6,287,064 B1 | 9/2001 | Jhumra et al. | |
| 6,350,092 B1 | 2/2002 | Powell | |
| 6,403,230 B1 | 6/2002 | Keener | |
| 6,471,179 B1 | 10/2002 | Tousi et al. | |
| 6,494,972 B1 | 12/2002 | Keener et al. | |
| 6,499,926 B2 | 12/2002 | Keener | |
| 6,638,381 B2 | 10/2003 | Keener et al. | |
| 6,794,012 B2 | 9/2004 | Tsotsis | |
| 6,796,759 B2 | 9/2004 | Aasgaard | |
| 6,797,012 B2 * | 9/2004 | Schulze zur Wiesche et al. | 8/405 |
| 6,979,129 B2 | 12/2005 | Farbaniec et al. | |
| 6,986,929 B2 * | 1/2006 | Tsotsis | 428/102 |
| 7,076,864 B2 * | 7/2006 | Malaka | 29/798 |
| 7,150,594 B2 * | 12/2006 | Keener | 411/34 |
| 7,307,825 B2 * | 12/2007 | De La Fuente De Ana et al. | 361/212 |
| 7,351,022 B2 * | 4/2008 | Denslow | 411/501 |
| 7,599,164 B2 * | 10/2009 | Heeter et al. | 361/218 |
| 7,654,909 B2 * | 2/2010 | Keener et al. | 470/5 |
| 7,695,226 B2 * | 4/2010 | March et al. | 411/43 |
| 7,874,059 B2 * | 1/2011 | Morrison et al. | 29/525.02 |
| 7,896,599 B2 * | 3/2011 | Stephen et al. | 411/377 |
| 7,898,785 B2 * | 3/2011 | Winter et al. | 361/117 |
| 7,966,711 B2 | 6/2011 | Keener | |
| 7,969,706 B2 * | 6/2011 | Heeter et al. | 361/218 |
| 7,996,975 B1 * | 8/2011 | Denslow | 29/419.1 |
| 8,186,614 B2 | 5/2012 | Sanchez-Brunete Ivarez et al. | |
| 2002/0172576 A1 | 11/2002 | Keener | |
| 2004/0058122 A1 * | 3/2004 | Tsotsis | 428/102 |
| 2005/0115046 A1 | 6/2005 | Woods et al. | |
| 2005/0125985 A1 | 6/2005 | Adams et al. | |
| 2005/0201845 A1 | 9/2005 | Keener | |
| 2006/0062650 A1 | 3/2006 | Keener | |
| 2006/0243860 A1 | 11/2006 | Kismarton | |
| 2006/0292375 A1 * | 12/2006 | Martin | 428/413 |
| 2008/0075555 A1 * | 3/2008 | March et al. | 411/361 |
| 2009/0029113 A1 * | 1/2009 | Sanchez et al. | 428/172 |
| 2010/0001137 A1 | 1/2010 | Keener | |
| 2010/0061031 A1 * | 3/2010 | Lopez-Reina Torrijos et al. | 361/218 |
| 2010/0219287 A1 | 9/2010 | Sánchez-Brunete Lvarez et al. | 244/1 A |
| 2010/0276055 A1 * | 11/2010 | Martin | 156/52 |
| 2010/0278616 A1 * | 11/2010 | March et al. | 411/508 |
| 2011/0001086 A1 * | 1/2011 | Kruckenberg et al. | 252/182.32 |

FOREIGN PATENT DOCUMENTS

| | | | |
|---|---|---|---|
| EP | 0316056 A1 | | 5/1989 |
| EP | 0392568 A1 | | 10/1990 |
| EP | 2058111 A1 * | | 5/2009 |
| GB | 2205374 A | | 12/1988 |
| JP | 2009144914 A * | | 7/2009 |
| WO | WO2005092517 | | 10/2005 |
| WO | WO2006036300 | | 4/2006 |

OTHER PUBLICATIONS

U.S. Appl. No. 11/838,573, filed Aug. 14, 2007, Keener.
U.S. Appl. No. 10/792,174, filed Mar. 3, 2004, Keener.
U.S. Appl. No. 10/945,120, filed Sep. 20, 2004, Keener.
EP Search Report dated Feb. 11, 2009 regarding application EP08253594, applicant's reference P103419EP00, applicant The Boeing Company, 8 pages.
EP Search Report dated Sep. 22, 2011 regarding application EP11178811, applicant's reference P45847EP1/JEP, applicant The Boeing Company, 7 pages.
PCT Search Report dated Jan. 2, 2006 regarding application PCT/US2005/027766, 3 pages.
USPTO Office Action dated May 18, 2006 regarding U.S. Appl. No. 10/945,120, 18 pages.

USPTO Office Action dated Dec. 19, 2005 regarding U.S. Appl. No. 10/945,120, 15 pages.
USPTO Office Action dated May 15, 2009 regarding U.S. Appl. No. 11/838,573, 13 pages.
USPTO Final Office Action dated Oct. 6, 2009 regarding U.S. Appl. No. 11/838,573, 12 pages.
USPTO Office Action dated Aug. 6, 2010 regarding U.S. Appl. No. 11/838,573, 5 pages.
USPTO Notice of Allowance dated Oct. 14, 2010 regarding U.S. Appl. No. 11/838,573, 4 pages.
Chung, "Carbon Fiber Composites," Butterworth-Heinemann, 1994, p. 97.
USPTO Office Action dated Sep. 21, 2012 regarding U.S. Appl. No. 12/538,564, 19 pages.

* cited by examiner

METHOD AND APPARATUS FOR ASSEMBLING COMPOSITE STRUCTURES

BACKGROUND INFORMATION

1. Field

The disclosure relates generally to a method and apparatus for assembling a structure by joining components that include components of non-metallic material. More particularly, the disclosure relates to a method and fastener apparatus for mechanically-joining components to assemble composite structures for aircraft and other applications.

2. Background

The use of structures comprised of composite materials has grown in popularity in recent years, particularly in such applications as aircraft, where benefits include exceptional durability and maintainability and a significant savings in weight.

Although composite structures are used in both civil and military aircraft, until quite recently, their use has been generally limited to secondary aircraft components and parts. There has been some reluctance to use composite materials for larger aircraft parts and primary structural airframe components.

Composite structures used in aircraft and other applications are often assembled from a plurality of individual composite components. One particular area of concern in connection with the use of assembled composite structures is the need to mechanically-join the composite components in order to assemble the structure. Despite the development of large co-cured composite structures and the continued refinement in bonding techniques, there remains a need to mechanically-join composite components used in an aircraft, particularly those composite components that may have to be removed for rework or replacement at some stage during the life of an aircraft.

Mechanical fasteners have been used for many years to assemble metallic structures used in aircraft applications, and procedures for assembling metallic structures are relatively straightforward. Using mechanical fasteners to assemble structures formed of advanced composite materials, however, requires a significantly different technological approach than when assembling metallic structures. The full advantages of composite materials cannot be achieved unless there is some reliable mechanism for mechanically-joining components formed of composite material.

Assembling composite structures by mechanically-joining components formed of composite materials such as carbon, epoxy, graphite, carbon/aramid, aramid, and glass-reinforced composite materials, using fasteners formed entirely of metallic components, is well-known in the aircraft industry. Metallic fasteners that are often used to assemble composite structures in aircraft include solid rivets, threaded pins, two-piece bolts, and blind fasteners made of Monel™ metal, titanium, stainless steel, and aluminum-alloy materials. Metallic fasteners, however, are not fully satisfactory for joining components formed of composite materials for several reasons.

Initially, although the solid metallic rivet is the simplest fastener type, when conventional solid metallic rivets, such as solid Monel™ rivets, are used to join components formed of composite materials, the rivets can be less than desirable because the rivets tend to radially expand during installation and produce an edgewise pressure on the composite components. Metallic fasteners, such as aluminum-alloy and stainless-steel fasteners, also expand and contract when exposed to temperature extremes, as may be encountered when used in aircraft applications, which is also less than desirable. Particularly when the components are formed of a carbon-fiber composite material, as is commonly used in aircraft applications, the contraction and expansion of metallic fasteners may cause changes in clamping or preloads associated with the fasteners.

Metallic fasteners used to join composite components may also be subjected to the combined effects of composite relaxation, progressive hole wear caused by cocking or prying forces, thermal variations, and the like.

A particularly significant problem with the use of metallic fasteners for joining composite components is that of galvanic corrosion. Galvanic corrosion may occur when metallic materials, especially aluminum-alloy material, are in contact with composite materials, particularly carbon-fiber composite materials. Galvanic corrosion may be due to chemical reaction of the aluminum with the carbon fibers of the composite components being joined. Although it may be known to apply a sacrificial or protective coating to conventional metallic fasteners to help guard against galvanic corrosion, the coating increases the cost of the fasteners. Fasteners formed of titanium, stainless-steel, or Monel™ materials are better able to resist the problem of galvanic corrosion and may be used instead of aluminum-alloy fasteners to join carbon-fiber composite components. Such fasteners, however, are more expensive than aluminum-alloy fasteners.

In order to prevent contact with the carbon fibers in carbon-fiber composite materials, fastener manufacturers have also tried using various material combinations, including steel and aluminum-alloy fasteners with glass fiber or adhesive-scrim insulation. These material combinations are also not fully satisfactory.

Manufacturers have also experimented with mechanical fasteners formed of composite materials rather than metal. For example, glass or carbon epoxy fasteners are known. Fasteners formed of composite materials, however, are not fully satisfactory in applications such as aircraft applications because they may not provide or achieve appropriate strength and material compatibility characteristics, or meet electrical conductivity requirements.

In particular, aircraft structures must provide a mechanism for dissipating electrical energy, for example, electrical energy generated as a result of the aircraft being struck by lightning. Composite structures used in aircraft, accordingly, typically include an electrically-conductive metallic component that may be sandwiched between assembled composite components or provided as a layer of the composite components to facilitate and satisfy electrical discharge requirements by directing electrical current toward external boundaries of the aircraft, such as wing tips.

If composite fasteners are used to join composite components, however, electric current may be restricted from flowing freely between the joined components; and, as a result, may not provide a suitable path for dissipating electrical current if, for example, the aircraft is struck by lightning. Also, without a suitable path to dissipate electric current, electric potential may build up, and when the electrical potential becomes great enough, a spark or electrical arcing may occur, which may be undesirable for the structure of the aircraft or may cause "noise" in the communications radio or other electrical systems of the aircraft.

There is, accordingly, a need for a mechanism for mechanically-joining components to assemble a composite structure, such as a composite structure of an aircraft, that meets electrical conductivity requirements while providing appropriate strength and material compatibility characteristics.

SUMMARY

An embodiment of the disclosure provides a method for mechanically-joining components to assemble a composite structure. A first component and a second component may be provided. At least one of the first and second components may comprise a composite component. A hole may be formed in each of the first and second components. A metallic sleeve may be placed in the holes in the first and second components such that the metallic sleeve is in contact with the first and second components, and a composite rivet may be placed in the metallic sleeve. Heat and a deforming force may be applied to the composite rivet to join the first and second components to form an assembled composite structure.

A further embodiment of the disclosure provides a fastener apparatus for mechanically-joining components to assemble a composite structure. The fastener apparatus may include a composite rivet and a metallic sleeve surrounding the composite rivet.

A further embodiment of the disclosure provides a method for mechanically-joining components to assemble a composite structure of an aircraft. A first component and a second component may be provided. At least one of the first and second components may comprise a composite component. An electrically-conductive metallic component may be provided. A metallic sleeve may be placed in holes in the first and second components and the electrically-conductive metallic component such that the metallic sleeve is in contact with the first and second components and the electrically-conductive metallic component, and a composite rivet may be placed in the metallic sleeve such that the composite rivet extends through the metallic sleeve. Heat and a deforming force may be applied to the composite rivet to join the first and second components and the electrically-conductive metallic component, such that the joined first and second components and the electrically-conductive metallic component form an assembled composite structure.

The features, functions, and advantages can be achieved independently in various embodiments or may be combined in yet other embodiments.

BRIEF DESCRIPTION OF THE DRAWINGS

The novel features believed characteristic of the embodiments are set forth in the appended claims. The embodiments themselves, however, as well as a preferred mode of use, further objectives and advantages thereof, will best be understood by reference to the following detailed description of advantageous embodiments when read in conjunction with the accompanying drawings.

DETAILED DESCRIPTION

Figure 1:
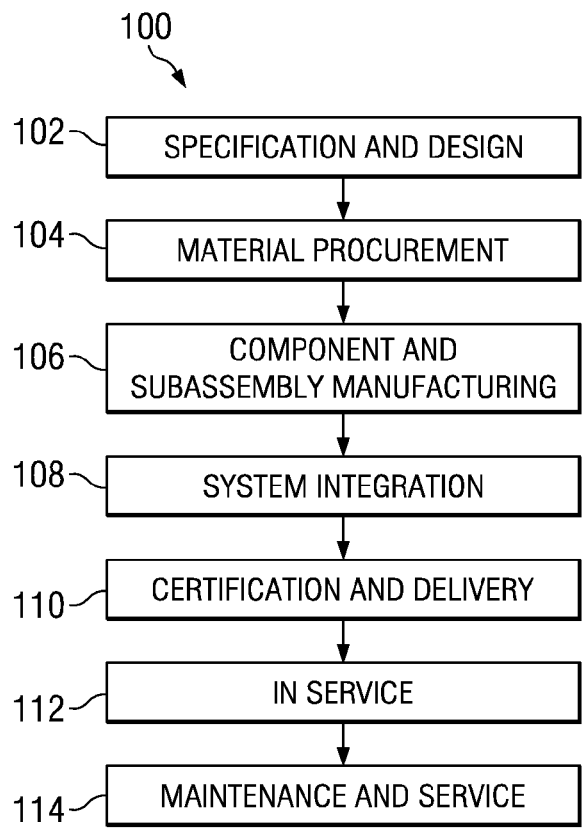
FIG. 1 is a flow diagram of aircraft production and service methodology.
Figure 2:
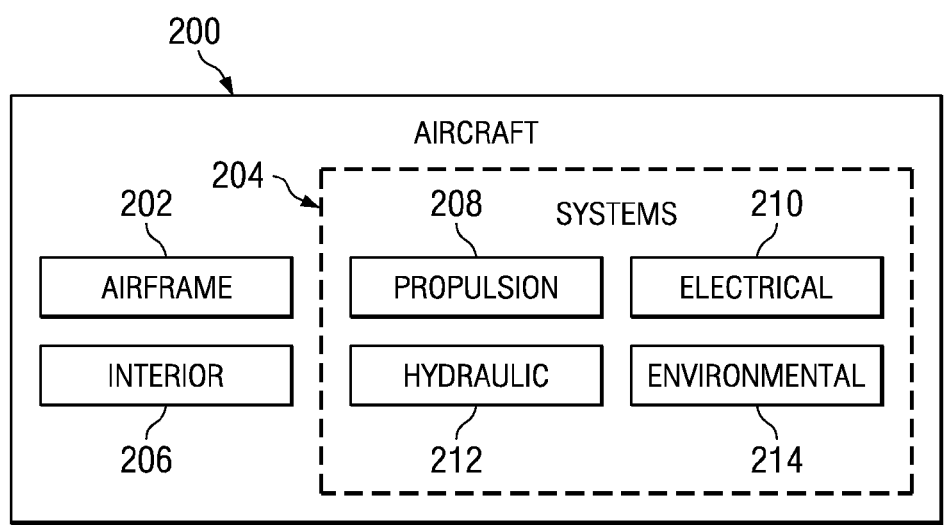
FIG. 2 is a block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, exemplary method 100 may include specification and design 102 of the aircraft 200 in FIG. 2 and material procurement 104. During production, component and sub-assembly manufacturing 106 and system integration 108 of the aircraft 102 takes place. Thereafter, the aircraft 200 in FIG. 2 may go through certification and delivery 110 in order to be placed in service 112. While in service by a customer, the aircraft 200 in FIG. 2 is scheduled for routine maintenance and service 114 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 200 produced by exemplary method 100 may include an airframe 202 with a plurality of systems 204 and an interior 206. Examples of high-level systems 204 include one or more of a propulsion system 208, an electrical system 210, a hydraulic system 212, and an environmental system 214. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or sub-assemblies corresponding to production process 106 may be fabricated or manufactured in a manner similar to components or sub-assemblies produced while the aircraft 200 is in service. Also, one or more apparatus embodiments, method embodiments, or a combination thereof may be utilized during the production stages 106 and 108, for example, by substantially expediting assembly of or reducing the cost of an aircraft 200. Similarly, one or more of apparatus embodiments, method embodiments, or a combination thereof may be utilized while the aircraft 200 is in service, for example and without limitation, maintenance and service 114.

Figure 3:
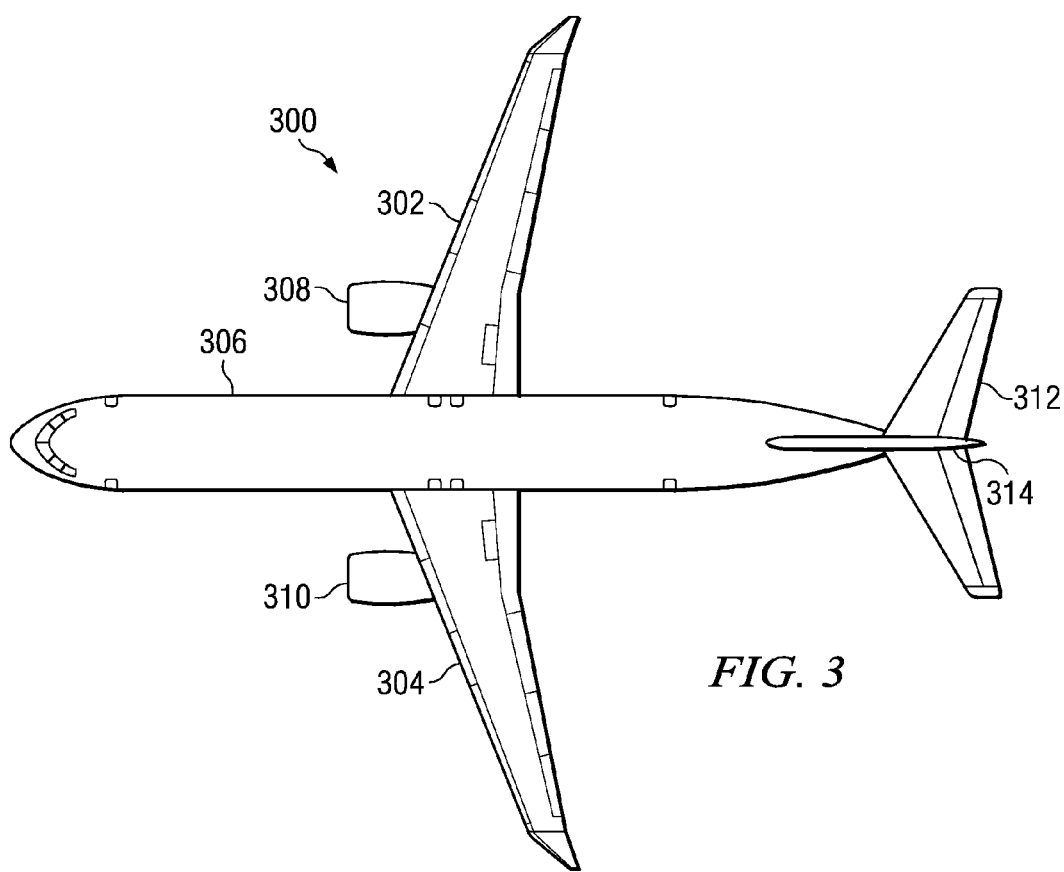
FIG. 3 is an illustration of an aircraft in which advantageous embodiments of the disclosure may be implemented.

With reference now to FIG. 3, an illustration of an aircraft is depicted in which advantageous embodiments of the disclosure may be implemented. More particularly, aircraft 300, which may be implemented as aircraft 200 in FIG. 2, is an example of an application which may utilize composite structures assembled by a method and apparatus for mechanically-joining composite components in accordance with advantageous embodiments of the disclosure.

In this illustrative example, aircraft 300 has wings 302 and 304 attached to fuselage or body 306. Aircraft 300 includes wing mounted engines 308 and 310. Further, aircraft 300 also includes horizontal and vertical stabilizers 312 and 314, respectively.

The use of structures formed of composite materials on aircraft has grown in popularity, in part, because such structures provide benefits of exceptional durability and maintainability and a significant savings in weight. Aircraft 300 may, for example, include composite structures forming body 306, wings 302 and 304, and horizontal and vertical stabilizers 312 and 314, as well as other structures including without limitation, movable flight control surfaces and landing gear doors.

Figure 4:
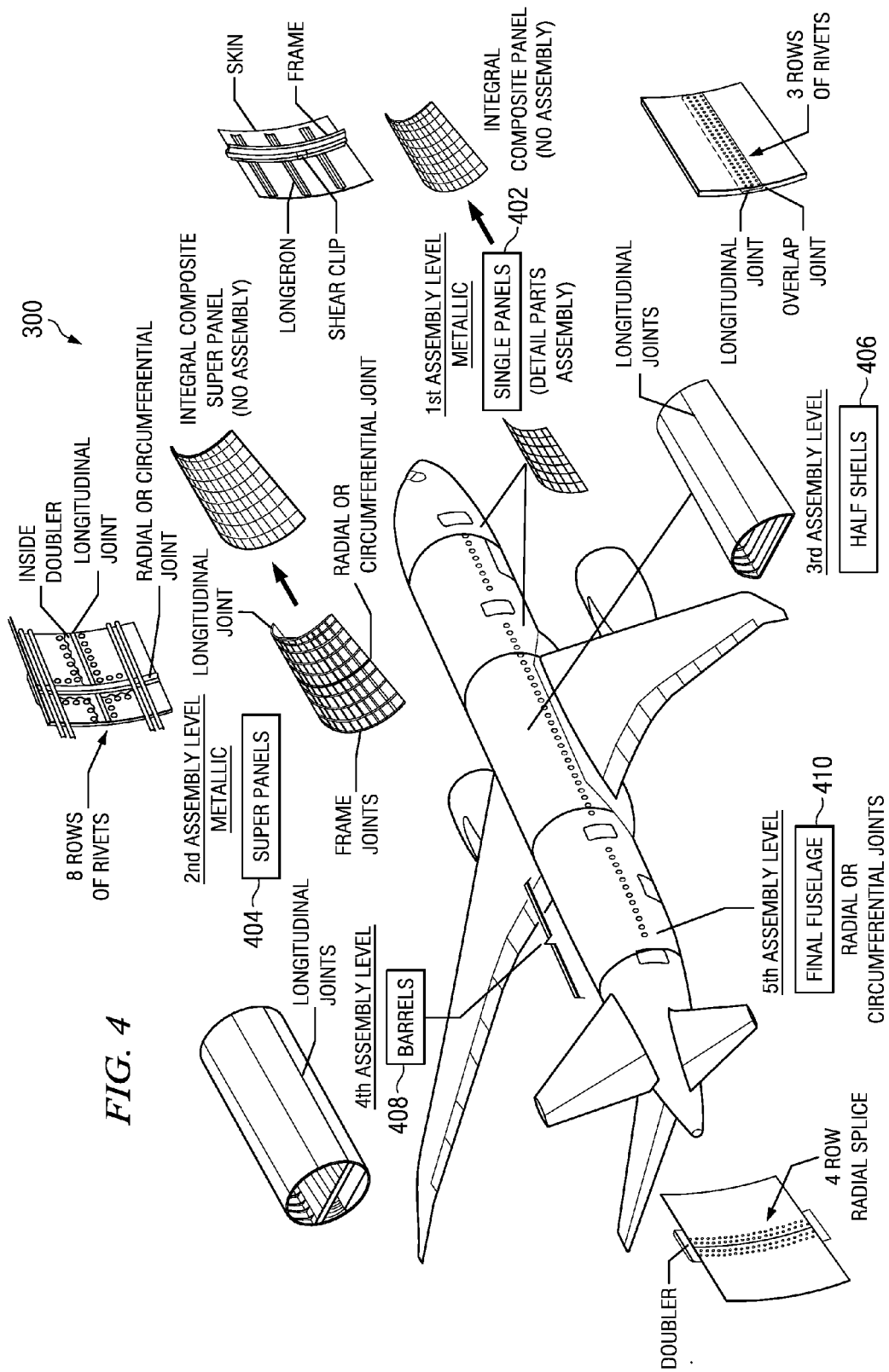
FIG. 4 is an illustration depicting major sub-assemblies of the aircraft of FIG. 3 in which advantageous embodiments of the disclosure may be implemented.

FIG. 4 is an illustration depicting major sub-assemblies of the aircraft of FIG. 3 in which advantageous embodiments of the disclosure may be implemented. As shown in FIG. 4, aircraft 300 includes various major sub-assembly components which may be assembled to form the fuselage of the aircraft. These components include single panels 402 which may be assembled to form super panel sub-assemblies 404. The super panel sub-assemblies 404 may, in turn, be assembled to form half shell sub-assemblies 406; and the half shell sub-assemblies 406 may be assembled to form barrel sub-assemblies 408. The barrel sub-assemblies 408 may finally be assembled to form fuselage assembly 410.

Sub-assemblies 404, 406, 408, and fuselage assembly 410 are examples of composite structures which may be assembled according to advantageous embodiments of the disclosure. It should be understood, however, that these are intended to be exemplary only as advantageous embodiments are not limited to assembling any particular type of composite structure for any particular type of application.

Despite the development of large co-cured composite structures and the continued refinement in bonding techniques, there remains a need to mechanically-join composite components used in an aircraft, particularly those composite components that might have to be removed for rework or replacement at some stage during the life of an aircraft.

Although mechanical fasteners have been used for many years to assemble metallic structures used in aircraft applications, and procedures for assembling metallic structures are relatively straightforward; using mechanical fasteners to assemble structures formed of advanced composite materials may benefit from a significantly different technological approach than when assembling metallic structures.

Advantageous embodiments provide a method and fastener apparatus for mechanically-joining components to assemble a composite structure for aircraft and other applications that meets electrical conductivity requirements and that provides appropriate strength while meeting material compatibility characteristics.

Figure 5A:
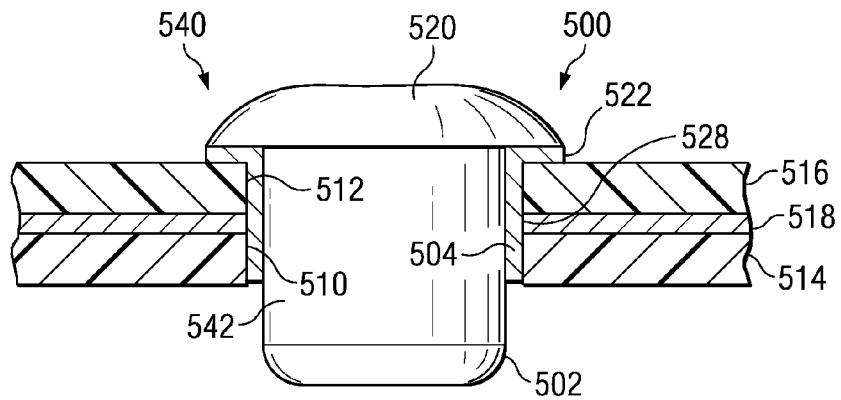
FIG. 5A is an illustration of a fastener apparatus for mechanically-joining components to assemble a composite structure according to an advantageous embodiment of the disclosure.

FIG. 5A is an illustration of a fastener apparatus for mechanically-joining components to assemble a composite structure according to an advantageous embodiment of the disclosure. The fastener apparatus is generally designated by reference number 500, and may include a one-piece fastener 502, usually referred to herein as rivet 502, surrounded by a cylindrical-shaped sleeve 504. In the advantageous embodiment illustrated in FIG. 5A, fastener apparatus 500 is shown as extending through aligned holes 510 and 512 in adjacent composite components 514 and 516, respectively, which are to be joined by fastener apparatus 500. Composite components 514 and 516 may, for example, be implemented as single panels 402 or other components of any of sub-assemblies 404, 406 or 408 or fuselage assembly 410 illustrated in FIG. 4. It should be understood, however, that this is intended to be exemplary only, as fastener apparatus 500 may be used to join any number of composite components in any application. Also, although FIG. 5A illustrates three components, including two composite components, to be joined to form a composite structure, generally designated by reference number 540, fastener apparatus 500 may be used to fasten any number of composite components or may be used to fasten one or more composite components to one or more components that are not formed of composite material. Yet further, although in the advantageous embodiment illustrated in FIG. 5A, composite components 514 and 516 comprise flat composite panels, this is also intended to be exemplary only, as composite components 514 and 516 can also be contoured or be of other shapes.

As shown in FIG. 5A, composite structure 540 may also include an electrically-conductive metallic component 518 such as an electrically-conductive metallic strip between composite components 514 and 516 to facilitate dissipating electrical energy, for example, as a result of a lightning strike. When metallic strip 518 is included in composite structure 540, fastener apparatus 500 may also extend through hole 528 in metallic strip 518 aligned with holes 510 and 512 in composite components 514 and 516, respectively. Electrically-conductive metallic component 518 may also be in the form of, for example and without limitation, a mesh, foil, or screen; and may be a separate layer as shown in FIG. 5A, or it may be a layer or ply embedded in one or both of composite components 514 and 516.

Rivet 502 may be a solid rivet formed of composite material, and sleeve 504 may be a cylindrical-shaped sleeve of an electrically-conductive metallic material, and having an outwardly extending annular collar 522 at one end thereof. Both the rivet and the sleeve may be pre-coated in a conventional manner, for example and without limitation, with Hi-Kote 1™ coating, although as will be explained hereinafter, the outer surface of the sleeve will normally not be pre-coated so as to not interfere with the electrical conductivity characteristics of the sleeve. The Hi-Kote 1™ coating and other similar coatings are described in commonly assigned U.S. Pat. Nos. 5,614,037, 5,858,133, 5,922,472, and 5,944,918, the contents of which are herein incorporated by reference.

According to an advantageous embodiment, rivet 502 may be formed of a thermoplastic polymeric resin. Thermoplastic polymeric resins are resins which may be melted and subsequently re-melted, and are often preferred for durable goods manufacturing over thermoset polymeric resins, such as epoxy, which are hardened via chemical reactions. Thermoplastic polymers generally have shorter processing times than thermoset polymers and can be subsequently re-heated and re-formed repeatedly if required. Thermoset polymeric resins, on the other hand, solidify when cured by mixing and/or heating and, once cured, cannot be re-melted or re-molded without significantly changing or altering the material properties of the resin.

According to an advantageous embodiment of the disclosure, rivet 502 may comprise a thermoplastic fluoropolymer resin such as polyetheretherketone fluoropolymer. Polyetheretherketone fluoropolymer is marketed by and available from Victrex Plc. under the trademark PEEK™.

Polyetheretherketone polymer is relatively easy to process and combines a number of characteristics that may make it particularly suitable for use in forming rivet 502 of fastener apparatus 500. Among the desirable characteristics of polyetheretherketone polymer include the following:

chemical resistance;
abrasion resistance;
high-temperature resistance;
hydrolysis resistance;
flame resistance with low smoke and toxic gases;
excellent electrical properties; and
excellent resistance to gamma rays.

Polyetheretherketone polymer may safely be used in operating environments having continuous elevated temperatures of up to about +500° F. The material has excellent resistance to a wide range of chemical environments, even at elevated temperatures. Fluoropolymers may have low tensile strength and surface softness. These properties may be adjusted, however, by adding suitable fillers and/or additives to the polymer, for example, via melt compounding. For example, short fibers of glass, carbon or titinate in a range of about 20-60 percent by volume, and, more preferably, in a range of about 20-30 percent by volume, can be added to the polymer to enhance the strength of rivet 502 without sacrificing any of the desirable thermal, chemical, and electrical properties of the polymer. In addition, the volume of fiber may also include, in addition to random inclusion of long and short fibers, a woven cylindrical sleeve or stocking of long fibers placed at the outer boundary or perimeter of the rivet to enhance strength. In general, the reinforcing fiber assists in reducing inconsistencies while improving dimensional stability, tensile strength, cut-through resistance and the like. "Inconsistencies," as the term is used in the appropriate context throughout this disclosure, refers to the difference between one or more measured characteristics of a composite structure under test (and potentially effected by exposure to factor(s) including, but not limited to, thermal load(s), structural load(s), lightning, or electrical arcing) with expected values for the same characteristics of an analogous composite structure unaffected by exposure to those factors.

It should be understood that although advantageous embodiments include rivets formed of polyetheretherketone polymer, other fluoropolymers and other polymers may also be used for rivet 502. For example, rivet 502 may also be formed of polyimide (trade name "Kapton"), polyetherimide (trade name "Ultem"), or polyarylimide (trade name "Torlon") aromatic fluoropolymer resins.

Sleeve 504 may be formed of an electrically-conductive metal such as titanium, stainless-steel, Monel™ materials, or another suitable metal that resists corrosion when in contact with the composite components being joined. Monel™ may be a suitable metal for use with graphite/epoxy composite components, while a number of metals may be safely used with Kevlar/epoxy composite materials. Titanium sleeves may be used with composite components formed of graphite/epoxy without requiring corrosion protection; however, pre-coating is generally recommended and preferred.

Figure 5B:
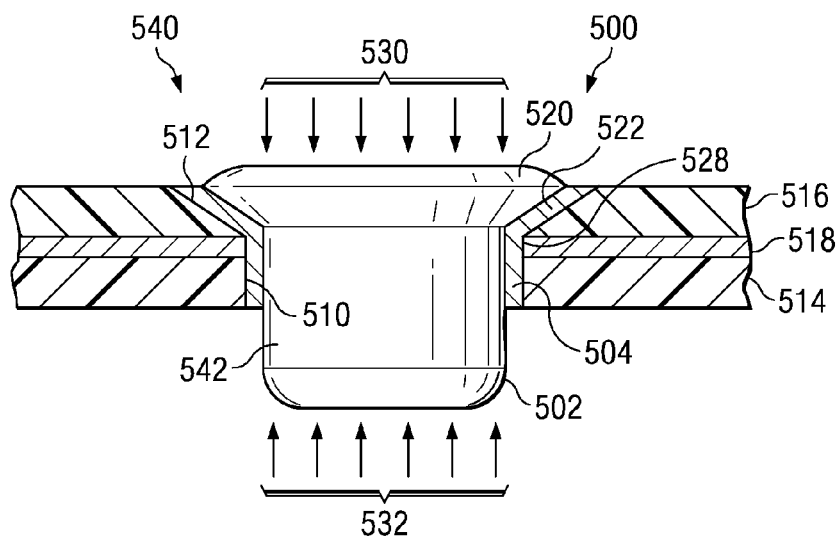
FIG. 5B is an illustration of the fastener apparatus of FIG. 5A during installation according to an advantageous embodiment of the disclosure.
Figure 5C:
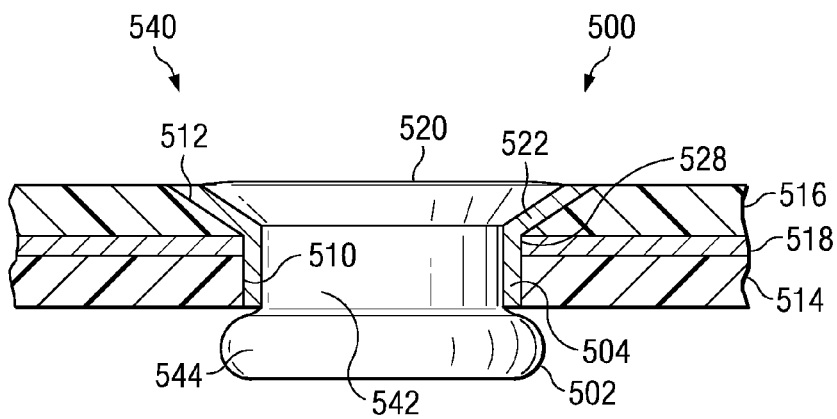
FIG. 5C is an illustration of the fastener apparatus of FIGS. 5A and 5B after installation according to an advantageous embodiment of the disclosure.

The configuration and the dimensions of rivet 502 and sleeve 504 may vary depending on the requirements of particular applications. In general, however, rivet 502 may have a relatively large head configuration in order to distribute loads uniformly over a larger surface area. In this regard, composite materials have a lower thickness compression strength than metallic materials, and providing the rivet with a relatively large head provides a greater bearing area or footprint, which may mitigate excessive loads on the composite components being joined. This may reduce crushing of the composite material during installation and assembly of the composite components. Typical rivet heads provide 100-degree and 130-degree countersink configurations. Rivet 502 may have a 130-degree head configuration, as best shown in FIG. 5C, to better distribute loads.

Shank 542 of rivet 502 may protrude or extend beyond the thickness of the stacked components being joined and may facilitate upsetting or forming during installation and to avoid crushing the surrounding composite matrix. The length of the protruding portion of shank 542 of rivet 502 may be equal to about 1.1-1.5 times the diameter of the rivet. The diameter of rivet 502 may be from about 3/16 inch to about 5/16 inch, although it should be understood that it is not intended to limit advantageous embodiments to rivets having any particular dimensions.

Sleeve 504 may have an outside diameter substantially equal to the diameter of aligned holes 510 and 512 in composite components 514 and 516 and aligned hole 528 in metallic strip component 518 being joined such that the sleeve will be in direct contact with all of components 514, 516 and 518 to provide a path for the flow of electric current between the components as will be described hereinafter. The length of sleeve 504 may be the same as or less than the combined length of aligned holes 510, 512 and 528 in components 514, 516 and 518, respectively, but sleeve 504 should be of sufficient length to ensure being in direct contact with all of components 514, 516 and 518. The flared end or annular collar 522 of sleeve 504 may have a diameter substantially equal to the diameter of head 520 of rivet 502 so that the head of the rivet will not come into contact with the composite component 516. Collar 522 also serves to properly position sleeve 504 in aligned holes 510, 512 and 528 by virtue of collar 522 coming into contact with the top surface of component 516 during installation of sleeve 504 in the aligned holes to limit the extent to which the sleeve 504 may be inserted into the holes.

Sleeve 504 may be relatively thin in order to minimize the overall weight of fastener apparatus 500. According to an advantageous embodiment, sleeve 504 may have a thickness of from about 0.008 inch to about 0.016 inch. It should be understood, however, that this is intended to be exemplary only as the thickness of the sleeve may be varied without departing from advantageous embodiments.

There may be an initial clearance between sleeve 504 and rivet 502 so as to avoid an interference fit. Typically, the clearance may be from about +0.002 inch to about +0.004 inch. During installation of rivet 502, shank 542 expands to provide a net or interference-fit installation.

Rivet 502 may be installed by applying localized heating to the rivet to soften it, and then squeezing the rivet to deform it. Hydraulically-driven fastening may not be recommended. FIG. 5B is an illustration of the fastener apparatus of FIG. 5A during installation according to an advantageous embodiment of the disclosure. As shown in FIG. 5B, rivet 502 may be squeezed by applying oppositely-directed forces to the head and tail ends of the rivet as represented by arrows 530 and 532, respectively. In the advantageous embodiments described herein, when fastener apparatus 500 is in place with mating components 514, 516 and 518, heat and a deforming force may then be applied to the composite rivet by a fastener installation tool. The applied heat may be at a temperature of from about 600-900 degrees F. and may be applied for about 1-5 minutes depending on the type and size of the rivet. The heat and deforming force applied by the fastener installation tool causes the protruding rivet shank to deform and expand, creating a rivet upset. Thereafter, rivet 502 is allowed to cool. This cooling results in composite rivet 502 re-consolidating or re-solidifying in a manner that the rivet upset retains the assembled composite components. In this manner, composite components 514 and 516 and electrically-conductive metallic component 518 are mechanically-fastened or joined together.

The fastener installation tool (not shown) may take various forms. For example, the fastener installation tool may be a hand tool in which fastener apparatus 500 is put into position and placed through aligned components 514, 516 and 518 by hand. In this example, the fastener installation tool provides heat and force to cause re-shaping or re-forming of the composite material within the protruding portion of rivet shank 542. In other examples, the fastener installation tool may be an automated or robotic-type system in which the fastener installation tool contains or retrieves a supply of fasteners to join aligned components 514, 516 and 518 to each other.

In FIG. 5B, the head 520 of rivet 502 has been placed into hole 512 of composite component 516 such that head 520 no longer protrudes from the hole. During the installation process, cylindrical sleeve 504 and its annular collar 522 have been deformed to correspond to the hole.

FIG. 5C is an illustration of the fastener apparatus of FIGS. 5A and 5B after installation according to an advantageous embodiment of the disclosure. As shown in FIG. 5C, the shank protrusion of the rivet has now also been deformed outwardly as shown at 544 so as to securely join composite components 514 and 516 and electrically-conductive metallic component 518. In this regard, it should be understood that the configuration or shape of rivet upset 544 in FIG. 3 is intended to be exemplary only, as rivet upset 544 may also be of other configurations or shapes.

Holes 510 and 512 in composite components 514 and 516 may be formed during manufacture of the components or they may be drilled after alignment and prior to assembly. When composite components, such as carbon-fiber composite components are drilled, fibers within the components may be exposed. These fibers can absorb water, which may be undesirable. Sealants may be used to prevent moisture absorption, but this solution may both complicate the process and add significant cost. It may also defeat any effort made to maintain electrical continuity between the composite components and the fastener since typical corrosion-inhibiting polysulfide sealants are dielectric in nature and impede conductivity efforts. Fastener apparatus according to advantageous embodiments incorporating an electrically-conductive sleeve surrounding a composite rivet may provide a sufficiently tight fit so as to reduce water absorption, as well as maintain fuel-tightness (for composite structures that store fuel) without the need for a sealant.

Fastener apparatus according to advantageous embodiments may provide a significant savings in weight as compared to similar metallic fasteners. A typical aircraft, for example, may require as many as 200,000 rivets resulting in a weight savings of about 600 pounds when a fastener apparatus according to advantageous embodiments is used to join components as opposed to using a one-piece, metallic rivet-type fastener. The resulting reduced weight may translate into a significant savings in fuel costs for operating the aircraft.

Fastener apparatus according to advantageous embodiments also provide an effective path for electrical current to flow between joined composite components. This is because following installation of the fastener apparatus, sleeve 504 may be in direct contact with the electrically-conductive fibers within the joined composite components as well as with the electrically-conductive metallic component incorporated in or sandwiched between the composite components. As a result, sleeve 504 provides a more electrically-conductive path for allowing electric current to flow from one composite component to the other. This may be particularly important in aircraft applications to provide a path for dissipating electrical energy generated as a result of the aircraft being struck by lightning or to prevent a build up of electrical potential which may cause an arc or spark which may have an undesirable effect on structures or, at least, undesirable "noise" in the electrical systems of the aircraft. As indicated previously, the outer surface of sleeve 504 is normally not pre-coated as such pre-coating may interfere with the ability of the sleeve to conduct electric current between the composite components.

In general, a fastener apparatus according to advantageous embodiments may provide an improved quality of installation as compared to metallic fasteners. This is, in part, due to the fact that any inconsistencies in the holes through which the fastener apparatus extends may be more readily accommodated by the cylindrical sleeve. There may also be a reduction in potential undesirable mechanical effects to the composite components being joined during fastener installation and component assembly including, but not limited to undesirable mechanical effects resulting from expansion or compression of the fastener either during installation or during actual operation. Reworking/replacement of the sleeve or rivet, if necessary, may also be improved thereby mitigating against potential inconsistencies to the surrounding composite structure.

Figure 6:
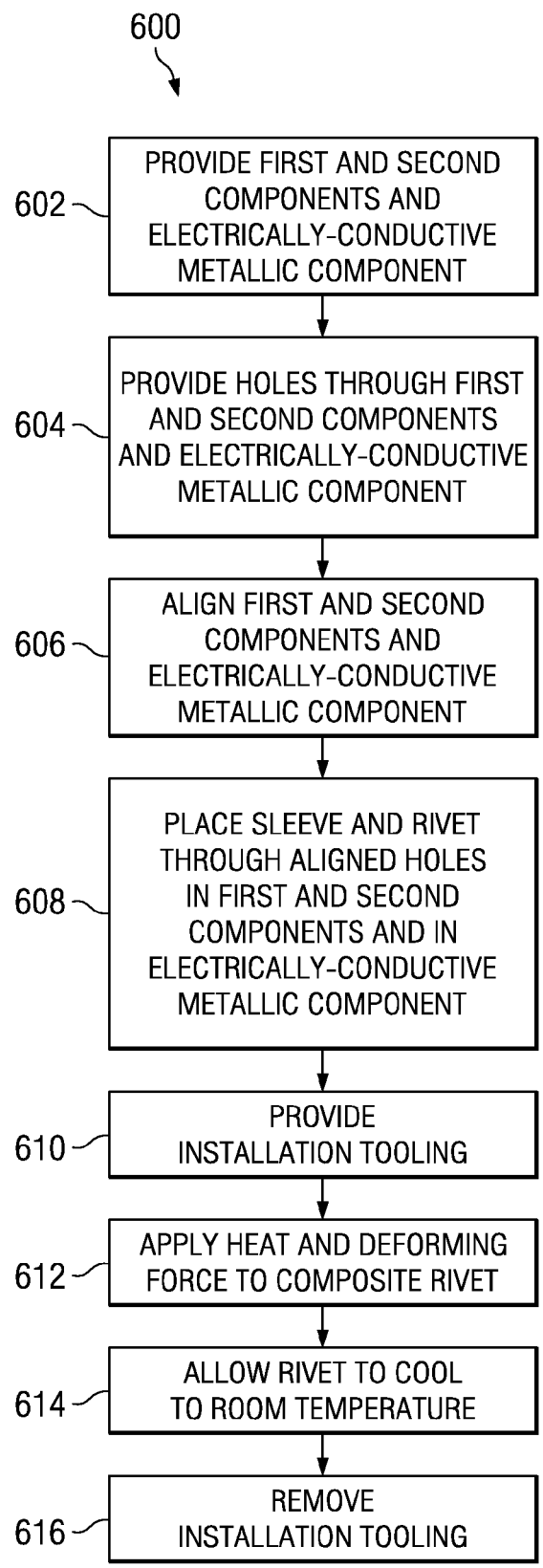
FIG. 6 is a flowchart that illustrates a method for mechanically-joining components in order to assemble a composite structure according to an advantageous embodiment of the disclosure.

FIG. 6 is a flowchart that illustrates a method for mechanically-joining components in order to assemble a composite structure according to an advantageous embodiment of the disclosure. The method is generally designated by reference number 600, and begins by providing first and second components and an electrically-conductive metallic component that are to be joined to provide the composite structure (Step 602). At least one and preferably both of the first and second components may be a composite component. A hole may be provided in each of the first and second components and in the electrically-conductive metallic component (Step 604). The holes may, for example, be provided by drilling the holes. Alternatively, the holes may be provided in the components prior to the time of assembly when the components are manufactured, or may be provided in another manner.

The first and second components and the electrically-conductive metallic component may be aligned with one another with the electrically-conductive metallic component sandwiched between the first and second composite components or incorporated in one or both of the first and second components as an embedded layer or ply thereof (Step 606). The components may be aligned by first forming the holes in the components and then aligning the holes or the components may first be aligned and the holes then simultaneously drilled through the aligned components. In either event, the holes should be drilled to minimize splintering and fraying with any loose fibers of the composite components being removed.

A fastener apparatus comprising a composite rivet surrounded by a metallic sleeve is then placed in the aligned holes such that the sleeve is in direct contact with both the first and the second components and with the electrically-conductive metallic component (Step 608). The sleeve may include an annular collar extending from an end thereof to assist in placing the sleeve.

The metallic sleeve and the composite rivet may be pre-assembled prior to their being placed in the aligned holes, or they may be placed in the aligned holes one at a time, in which case, the sleeve may be first placed in the aligned holes, and then the composite rivet may be placed in the sleeve.

When the fastener apparatus is positioned in the aligned holes, a head of the rivet seats flush into the collar portion of the sleeve, and a cylindrical shank of the rivet extends or protrudes from the opposite side of the aligned holes beyond the structure to be assembled. Both the inside diameter of the metallic sleeve and the surfaces of the composite rivet may be pre-coated, if desired.

Installation tooling may then be provided (Step 610), and both heat and a deforming force may then be applied to the composite rivet to soften and deform the rivet to join the first and second components and the electrically-conductive metallic component to form an assembled composite structure (Step 612). More particularly, the deforming force may be a squeezing force that deforms the protruding shank of the rivet to form a securely joined, assembled composite structure. The applied heat may be at a temperature of from about 600-900 degrees F. and may be applied for about 1-5 minutes depending on the type, size, and resin material of the rivet.

Following joining of the components, the rivet is allowed to cool to room temperature (Step 614), and the installation tooling is removed (Step 616).

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A method for mechanically-joining components to assemble a composite structure, comprising:
    providing a first component, a second component, and an electrically-conductive metallic component, at least one of the first and second components comprising a composite component;
    forming a hole in each of the first component, second component, and electrically-conductive metallic component;
    placing a metallic sleeve in the holes in the first component, second component, and electrically-conductive metallic component such that the metallic sleeve is in contact with the first and second components and the electrically-conductive component, the metallic sleeve having a collar at one end;
    placing a one-piece composite rivet in the metallic sleeve, the composite rivet having a head and a shank, the head resting against the collar of the metallic sleeve and the head substantially not in contact with the first component or the second component, the shank protruding beyond the first component; and
    applying heat and a deforming force to the shank of the composite rivet to form an upset on the composite rivet, the heat applied to the shank between about 600 to about 900 degrees F., the rivet the heat melting the shank but not the first component or the second component, with upset mechanically joining the first component, the second component, and the electrically-conductive metal component such that the electrically-conductive metallic component provides a path for dissipating electrical energy between the first component and the second component.

2. The method according to claim 1, and further comprising:
    aligning the holes in the first and second components.

3. The method according to claim 1, wherein forming a hole in each of the first and second components comprises:
    drilling the hole in each of the first and second components.

4. The method according to claim 1, wherein the step of placing the metallic sleeve in the holes in the first and second components, and the step of placing the composite rivet in the metallic sleeve comprises:
    pre-assembling the metallic sleeve and the composite rivet so as to form a pre-assembled metallic sleeve and composite rivet; and
    placing the pre-assembled metallic sleeve and composite rivet in the holes in the first and second components.

5. The method according to claim 1, wherein providing an electrically-conductive metallic component comprises one of providing an electrically-conductive metallic component between the first and second components, and providing an electrically-conductive metallic component as a layer of at least one of the first and second components.

6. The method according to claim 1, wherein the composite rivet comprises a fluoropolymer composite rivet.

7. The method according to claim 6, wherein the fluoropolymer composite rivet comprises a polyetheretherketone fluoropolymer composite rivet.

8. The method according to claim 1, wherein the composite rivet comprises a one-piece fiber-reinforced composite rivet.

9. The method according to claim 1, wherein the metallic sleeve comprises one of a titanium, stainless-steel, and Monel™ metallic sleeve.

10. The method according to claim 1, wherein the first and second components comprise carbon-fiber composite components.

11. The method according to claim 1, wherein the composite structure comprises a composite structure of an aircraft.

12. The method according to claim 1, wherein the step of applying heat and a deforming force further comprises forming a second side of the rivet so as to substantially match a surface of the first component.

13. The method according to claim 1, wherein the metallic sleeve comprises a cylindrical portion and an outward extending annular collar, the annular collar in contact with a surface of one of the first component and the second component.

14. The method according to claim 1, wherein the metallic sleeve comprises a flared end.

15. The method of claim 1, further comprising deforming both a first end and a second end of the composite rivet.

16. The method of claim 1, wherein the step of applying heat and a deforming force melts the shank of the rivet but does not substantially fuse the rivet to the first component or the second component.

17. The method of claim 1, placing a one-piece composite rivet further comprises the shank protruding beyond the second composite component to expose a protruding portion of the shank, the protruding portion equal to about 1.1 to about 1.5 times a diameter of the shank.

18. A method for mechanically-joining composite components to assemble a composite structure of an aircraft, comprising:
    providing a first component and a second component, at least one of the first and second components comprising a composite component;
    providing an electrically-conductive metallic component;
    placing a metallic sleeve in holes in the first and second components and the electrically-conductive metallic component such that the metallic sleeve is in contact with the first and second components and the electrically-conductive metallic component, the metallic sleeve having a collar at one end;
    placing a one piece composite rivet in the metallic sleeve such that the composite rivet extends through the metallic sleeve with an initial clearance between the composite rivet and the metallic sleeve so as to avoid an interference fit therebetween, the composite rivet having a head and a shank, the head resting against the collar of the metallic sleeve and the head substantially not in contact with the first component or the second component, the shank protruding beyond the first component; and
    applying heat and a deforming force to the shank of the composite rivet so as to form an upset on the composite rivet, the heat applied to the shank between about 600 to about 900 degrees F., the heat melting the shank but not the first component or the second component, the rivet with upset mechanically joining the first component, the second component, and the electrically-conductive metal component such that the joined first and second components and the electrically-conductive metallic component form an assembled composite structure, and further such that the electrically-conductive metallic component provides a path for dissipating electrical energy between the first component and the second component.

19. The method according to claim 18, wherein the composite rivet comprises a fluoropolymer composite rivet, and wherein the metallic sleeve comprises one of a titanium, stainless steel, and Monel™ metallic sleeve.

20. The method according to claim 18, wherein the step of applying heat and a deforming force further comprises forming a second side of the rivet so as to substantially match a surface of the first component.

21. The method of claim 18, wherein the metallic sleeve comprises a cylindrical portion and an outward extending annular collar, the annular collar in contact with a surface of one of the first component and the second component.

22. A method for joining components to assemble a composite structure, comprising:
   forming a hole in each of a first composite component, a second composite component, and an electrically-conductive metallic component positioned between the first composite component and the second composite component;
   placing a metallic sleeve in the holes in the first composite component, the second composite component, and the electrically-conductive metallic component such that the metallic sleeve is in contact with the first composite component, the second composite component, and the electrically-conductive component, the metallic sleeve having a collar at one end, and the metallic sleeve being coated on an interior surface but not coated on an outer surface in contact with the electrically-conductive metallic component;
   placing a one-piece composite rivet in the metallic sleeve with an initial clearance between the composite rivet and the metallic sleeve so as to avoid an interference fit therebetween, the composite rivet having a head and a shank, the head resting against the collar of the metallic sleeve such that the head does not substantially contact the first composite component, the shank protruding beyond the second composite component to expose a protruding portion of the shank, the protruding portion equal to about 1.1 to about 1.5 times a diameter of the shank; and
   applying heat and a deforming force to the shank of the composite rivet so as to melt the shank and to form an upset on the composite rivet, the heat not melting the second composite component, the heat applied to the shank between about 600 to about 900 degrees F., the rivet with upset mechanically joining the first composite component, the second composite component, and the electrically-conductive metal component.

\* \* \* \* \*